United States Patent
Schmidt et al.

(10) Patent No.: US 11,073,079 B2
(45) Date of Patent: Jul. 27, 2021

(54) METHOD FOR OPERATING AN INTERNAL COMBUSTION ENGINE, AND INTERNAL COMBUSTION ENGINE

(71) Applicant: MTU Friedrichshafen GmbH, Friedrichshafen (DE)

(72) Inventors: Günther Schmidt, Friedrichshafen (DE); Ralf Speetzen, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 16/686,719

(22) Filed: Nov. 18, 2019

(65) Prior Publication Data

US 2020/0158013 A1    May 21, 2020

Related U.S. Application Data

(63) Continuation of application No. PCT/EP2018/062538, filed on May 15, 2018.

(30) Foreign Application Priority Data

May 18, 2017  (DE) ..................... 10 2017 110 857.2

(51) Int. Cl.
*F02B 69/06* (2006.01)
*F02B 75/02* (2006.01)
(Continued)

(52) U.S. Cl.
CPC .............. *F02B 69/06* (2013.01); *F02B 75/02* (2013.01); *F02D 23/00* (2013.01);
(Continued)

(58) Field of Classification Search
CPC .......... F02B 75/02; F02B 69/06; F02D 23/00; F02D 41/3058
See application file for complete search history.

(56) References Cited

U.S. PATENT DOCUMENTS 7,421,981 B2    9/2008  Wakeman
7,481,185 B1    1/2009  Park et al.
(Continued)

FOREIGN PATENT DOCUMENTS

CN    103422982 A    12/2013
DE    199 51 093 C2    4/2001
(Continued)

OTHER PUBLICATIONS

International Search Report and Written Opinion dated Jul. 20, 2018 for International Application No. PCT/EP2018/062538 (12 pages).

*Primary Examiner* — Kevin A Lathers
(74) *Attorney, Agent, or Firm* — Taylor IP, P.C.

(57) ABSTRACT

A method for operating an internal combustion engine having an engine with a first number of cylinders and a second number of cylinders and a supercharger arrangement, wherein a charge air flow supplied to the engine is compressed by means of at least one compressor and at least one turbine is acted on by an exhaust gas flow discharged from the engine. In a main operating mode, the engine operates the first number of cylinders in two-stroke operation and the second number of cylinders in four-stroke operation. A scavenging gradient of the engine is greater for the cylinders operated in the two-stroke operation than for the cylinders operated in the four-stroke operation.

15 Claims, 3 Drawing Sheets

(51) Int. Cl.
 *F02D 23/00* (2006.01)
 *F02D 41/30* (2006.01)
(52) U.S. Cl.
 CPC .... *F02D 41/3058* (2013.01); *F02B 2075/025* (2013.01); *F02B 2075/027* (2013.01); *F02D 2400/02* (2013.01); *F02D 2400/04* (2013.01)

(56) References Cited

U.S. PATENT DOCUMENTS

| | | |
|---|---|---|
| 7,661,263 B2 | 2/2010 | Coleman et al. |
| 9,732,682 B2 | 8/2017 | Tietze et al. |
| 10,731,526 B2 | 8/2020 | Lahr |
| 2010/0300383 A1* | 12/2010 | Pursifull ................ F02B 69/06 123/21 |
| 2014/0069372 A1 | 3/2014 | Tietze et al. |

FOREIGN PATENT DOCUMENTS

| | | | |
|---|---|---|---|
| DE | 19951093 A1 * | 4/2001 | ............. F02B 69/06 |
| DE | 10 2015 220 972 A1 | 4/2017 | |
| EP | 1 380 738 A1 | 1/2004 | |

\* cited by examiner

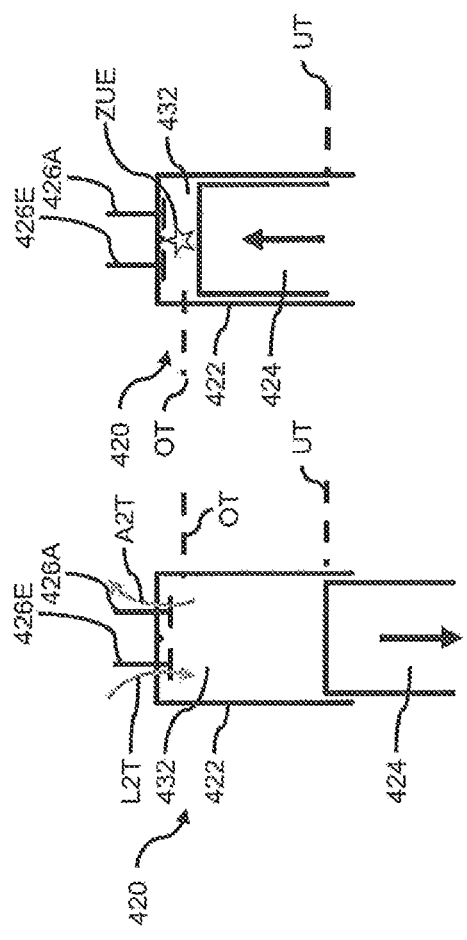
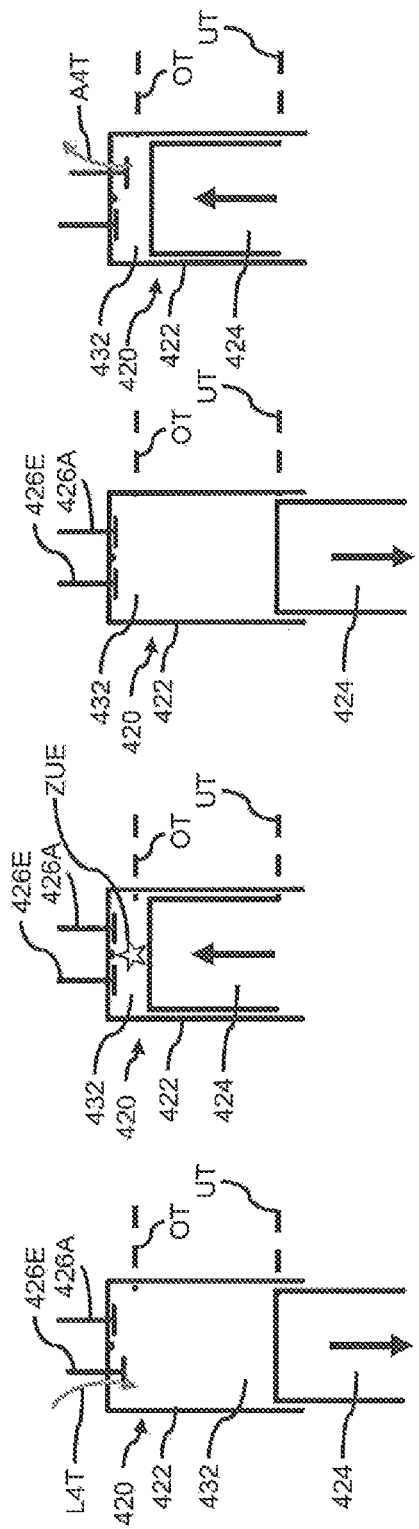

METHOD FOR OPERATING AN INTERNAL COMBUSTION ENGINE, AND INTERNAL COMBUSTION ENGINE

CROSS REFERENCE TO RELATED APPLICATIONS

This is a continuation of PCT application No. PCT/EP2018/062538, entitled "METHOD FOR OPERATING AN INTERNAL COMBUSTION ENGINE, AND INTERNAL COMBUSTION ENGINE", filed May 15, 2018, which is incorporated herein by reference.

BACKGROUND OF THE INVENTION

1. Field of the Invention

The invention relates to a method for operating an internal combustion engine.

2. Description of the Related Art

Methods for operating an internal combustion engine, in particular for operating an internal combustion engine both in two-stroke operation and in four-stroke operation, are generally known.

U.S. Pat. No. 7,421,981 describes a switching mechanism which can selectably switch over between two-stroke operation and four-stroke operation of an engine, wherein the switching mechanism is switchable between engagement with a first cam lobe for four-stroke operation and engagement with a second cam lobe for two-stroke operation.

This fundamentally advantageous approach is distinguished by switchability between two-stroke operation and four-stroke operation, depending on constraints and requirements during operation.

The problem with such an approach, and generally in the case of two-stroke operation, is that of achieving a sufficiently high scavenging gradient, especially when charging via a turbocharger or similar supercharger.

What is needed in the art is a way to address at least one of the aforementioned problems and in particular to improve the scavenging of cylinders of an internal combustion engine, in particular in two-stroke operation.

SUMMARY OF THE INVENTION

This is where the invention comes in, the object of which is to provide an improved method by means of which at least one of the aforementioned problems is addressed.

The present invention includes an engine with a first number of cylinders and a second number of cylinders and a supercharger arrangement, wherein a charge air flow supplied to the engine is compressed by at least one compressor and at least one turbine is acted on by an exhaust gas flow discharged from the engine. The invention also relates to a device for operating an internal combustion engine and to an internal combustion engine for carrying out the method.

The present invention is based on a method for operating an internal combustion engine with a first number of cylinders and a second number of cylinders and a supercharger arrangement, wherein a charge air flow supplied to the engine is compressed by at least one compressor and at least one turbine is acted on by an exhaust gas flow discharged from the engine.

According to the invention, it is provided that the method further comprises the step: in a main operating mode, operating the first number of cylinders in two-stroke operation and the second number of cylinders in four-stroke operation, wherein a scavenging gradient is greater for the cylinders operated in two-stroke operation than for the cylinders operated in four-stroke operation.

A first number of cylinders is taken to mean at least one first cylinder or a plurality of first cylinders. Similarly, a second number of cylinders is taken to mean at least one second cylinder or a plurality of second cylinders.

The invention has realized that different scavenging pressures or scavenging gradients are required for two-stroke operation and four-stroke operation. Here, the scavenging gradient refers to the pressure difference between compressed fresh, or charge air, after compression and the exhaust gas discharged from the engine, before entry into the waste-steam turbine. Since modern engines are usually operated with an exhaust gas turbocharger, they can, in particular, due to the rigid connection between the turbine and the compressor, only realize relatively small differential pressures of, in particular, about 0.6 bar in the characteristic engine map. This value lies in a range that is not optimum, in particular for two-stroke operation.

Due to this problem, high-speed diesel engines are generally operated in four-stroke operation. Only with slow-running diesel engines is there sufficient time available for the cylinder scavenging, so that such low-speed diesel engines can be driven in two-stroke operation.

To achieve the object, the concept of the invention also leads to an internal combustion engine and a device for operating the internal combustion engine.

Accordingly, the device is intended for operating an internal combustion engine with a first number of cylinders and a second number of cylinders and a supercharger arrangement, wherein a charge air flow, supplied to the engine can be compressed by means of at least one compressor and at least one turbine can be acted on by an exhaust gas flow discharged from the engine. The present invention is in particular designed for carrying out a method according to the concept of the invention for controlling and regulating the internal combustion engine, characterized by control and processor means:

for operating the internal combustion engine in a main operating mode, wherein the first number of cylinders are operated in two-stroke operation and the second number of cylinders are operated in four-stroke operation, wherein a scavenging gradient is greater for the cylinders operated in two-stroke operation than for the cylinders operated in four-stroke operation.

The internal combustion engine has an engine with a first number of cylinders, a second number of cylinders and a supercharger arrangement with at least one low-pressure stage, wherein a charge air flow, supplied to the engine, can be compressed by at least one compressor and at least one turbine can be acted on by an exhaust gas flow discharged from the engine. There is a device for operating the internal combustion engine, by control and processor means:

for operating the internal combustion engine in a main operating mode, wherein the first number of cylinders are operated in two-stroke operation and the second number of cylinders are operated in four-stroke operation.

and where a scavenging gradient is greater for the cylinders operated in the two-stroke operation than for the cylinders operated in the four-stroke operation.

With the same installation space and weight of an engine, the actual power is greater, by up to about 70%, in a two-stroke engine than in a four-stroke engine. This is contrasted by design-related disadvantages of the two-stroke engine, in particular higher fuel consumption and higher pollutant emissions.

However, the switching over between two-stroke operation and four-stroke operation requires a sufficiently high scavenging gradient for two-stroke operation, in particular, in order to ensure sufficient cylinder scavenging in the time dictated by the cycle.

The invention has also realized that the production of an appropriate and sufficient scavenging gradient is a prerequisite for a main operating mode of the first number of cylinders in two-stroke operation and the second number of cylinders in four-stroke operation. According to the invention, a scavenging gradient is therefore greater for the cylinders operated in two-stroke operation than for the cylinders operated in four-stroke operation. In particular, for an advantageous switchability of a cylinder between two-stroke operation and four-stroke operation, the production of an appropriate and sufficient scavenging gradient is a prerequisite for the cylinder.

Advantageous developments of the invention can be found in the dependent claims and specify in detail advantageous possibilities for realizing the concept explained above within the context of the set object and with regard to further advantages.

One development is based on the consideration that a switchability, in particular a temporary switchability, of an engine from four-stroke operation to two-stroke operation and from two-stroke operation to four-stroke operation, is advantageous, in particular with regard to economy and ecological efficiency.

These advantages concern in particular the greater flexibility for achieving optimum operating states of the engine, in particular with regard to consumption, power and pollutant emissions. In particular, the possibility of switching between two-stroke operation and four-stroke operation allows the advantages of both operating modes to be combined.

Selective switchability of the operation of individual cylinders and/or a number of cylinders from four-stroke operation to two-stroke operation allows the advantages of both two-stroke operation and four-stroke operation to be combined, and in particular a sufficient scavenging gradient to be realized.

This is made possible by a use of the exhaust gas stream corresponding to the operation of a number of cylinders, in particular by single-stage or multi-stage charging, in particular by a single-stage or multi-stage, selectively loadable, supercharger arrangement.

For example, this advantage is as follows in the case of multi-stage charging, in particular two-stage charging. If a cylinder, or a number of cylinders, are operated in two-stroke operation, then a first exhaust gas flow originating from this cylinder, or from this number of cylinders, can, according to the concept of the invention, be advantageously supplied for a corresponding use, leading in particular to a lower exhaust back pressure. This includes the admission of the first exhaust gas flow to a low-pressure stage of the supercharger arrangement. In this way, a scavenging gradient sufficient for two-stroke operation can be produced.

At the same time, a second exhaust gas flow, which originates from a cylinder or a number of cylinders that are operated in four-stroke operation, and consequently require a lower scavenging gradient, can be supplied for a further use, in particular different from the use of the first exhaust gas flow. In particular, as corresponds to the higher exhaust gas back pressure, that is possible due to the four-stroke operation, this use may advantageously be admission of the second exhaust gas flow to a high-pressure stage of the supercharger arrangement.

Of course, in the case of the method according to the invention an advantageous use of one or more exhaust gas flows is also possible in single-stage charging. It is equally possible and even worthwhile, in the case of the method according to the invention, to carry out multi-stage charging. In particular, by multi-stage admission to a multi-stage supercharger arrangement, the energy of an exhaust gas flow, which originates from a cylinder or a number of cylinders that are operated in four-stroke operation can be used, to better advantage as compared with just single-stage charging, for energy recovery.

These two measures interact synergistically, because according to the concept of the invention, the higher exhaust gas energy of the second exhaust gas flow, originating from the cylinders operated in four-stroke operation, is advantageously used for producing a sufficient scavenging gradient in the cylinders operated in two-stroke operation.

In this way it is possible with the same number of cylinders, the same installation space and the same weight, to realize an engine power that is 30% to 40% higher. Thus, for example, virtually the same performance can be achieved with a 12 cylinder V engine as previously with a 16 cylinder V engine.

It is advantageously provided that the method further includes the steps: in a four-stroke operating mode, operating the first number of cylinders and the second number of cylinders in four-stroke operation, in a two-stroke operating mode, operating the first number of cylinders Z1 (FIG. 1) and the second number of cylinders Z2 in two-stroke operation. This may specifically include operating all the cylinders of the engine either in four-stroke operation or in two-stroke operation. In particular in the case of two-stroke operation of the cylinders, it should be noted that suitable possibilities for compressing the charge air, to produce a sufficiently high scavenging gradient, is provided.

The method further includes the step of switching the engine over from four-stroke operation of the four-stroke operating mode to two-stroke operation of the two-stroke operating mode. This development specifically includes switching over during operation from four-stroke operation to two-stroke operation, in order to advantageously achieve a higher power of the engine in the short term.

It is advantageously provided that the method further includes the step of switching the engine over from two-stroke operation of the two-stroke operating mode to four-stroke operation of the four-stroke operating mode. This may specifically mean that, after it has already been switched over in a previous step from four-stroke operation to two-stroke operation, the engine of the internal combustion engine is switched back again to four-stroke operation. This is advantageous if the higher power of two-stroke operation, which is advantageously used in the case of transient requirements, such as for example during acceleration, is not required in a momentary operating state of the engine. In such an operating state, in particular a steady operating state, the internal combustion engine can therefore, according to the concept of the invention, be switched to four-stroke operation for the benefit of lower fuel consumption and lower pollutant emissions.

Within the scope of a particularly preferred development, it is provided that, in the main operating mode, the first number of cylinders or the second number of cylinders is switched over from four-stroke operation to two-stroke operation. This may specifically include that during operation of the internal combustion engine, switching of individual cylinders or groups of cylinders from four-stroke operation to two-stroke operation is possible. In this way, the operating state of the engine can be flexibly adapted to momentary constraints, that is to say constraints temporarily prevailing at a certain time, in particular with regard to required power, fuel consumption and pollutant emissions. Furthermore, in particular by targeted setting of the ratio of cylinders operated in four-stroke operation to cylinders operated in two-stroke operation, the compressor power, and consequently the achievable scavenging gradient, can be influenced, in particular for the cylinders operated in two-stroke operation. A switching over of individual cylinders or a number of cylinders from four-stroke operation to two-stroke operation generally leads to a short-term increase in the available power, and is consequently advantageous in the case of transient operating states, such as for example during acceleration.

It is advantageously provided that, in the main operating mode, the first number of cylinders or the second number of cylinders is switched over from two-stroke operation to four-stroke operation. By analogy with the previously mentioned development, a switchability of individual cylinders or a number of cylinders from two-stroke operation to four-stroke operation leads to the advantage that the operating state of the engine can be adapted flexibly to momentary constraints. Furthermore, as stated above, the scavenging gradient can likewise be advantageously set. A switching over of individual cylinders or a number of cylinders from two-stroke operation to four-stroke operation generally leads to lower emission of pollutants and lower fuel consumption.

It is advantageously provided that, when operating the internal combustion engine or a number of cylinders in two-stroke operation, one or more cylinders are scavenged by head loop scavenging. This specifically means in particular that the combustion chamber formed by the cylinder and the piston is scavenged, that is to say flooded and emptied, via openings or valves which are arranged on one side of the combustion chamber, in particular on the upper inner side or head side of the cylinder. Such a development leads to the advantage that the structure of the engine and in particular the structure of the individual cylinders are similar to the structure of a four-stroke engine. By adapting the valve timing, for example by hydraulic adjustment of the camshaft, to switch over between two-stroke operation and four-stroke operation.

Nevertheless, it is possible that, when operating the internal combustion engine in two-stroke operation, the cylinders are scavenged by a uniflow scavenging or through scavenging. This includes in particular that a scavenging of the combustion chamber formed by the piston and the cylinder takes place between two different, in particular opposite sides. The combustion chamber is thereby flooded by inlet slots lying in the region of the bottom dead center and emptied again by valves lying in the region of the top dead center. In this way, a good efficiency of the scavenging is advantageously achieved, in particular since substantially the entire combustion chamber is taken up by the flow and the risk of dead space formation is consequently low. Furthermore, it is possible, in particular by a tangential arrangement of the inlet slots, to influence, and in particular to further improve, the scavenging by generating a swirl.

In the case of uniflow scavenging, passing over of the piston or any piston rings and/or piston seals by inlet slots, which are arranged in particular in the lower region of the cylinder, leads to these components undergoing mechanical stress. This can lead to an increased risk of damage or to increased wear of the piston, or any piston rings and/or piston seals. In the case of head loop scavenging, this risk is consequently advantageously reduced.

In particular, it is provided that the first number of cylinders are arranged in a first cylinder bank and the second number of cylinders are arranged in a second cylinder bank. This specifically includes in particular that the first number of cylinders and the second number of cylinders are arranged spatially separate, in the case of a V-type engine respectively on a first cylinder bank and an opposite second cylinder bank.

It is advantageously provided that cylinders of the first number of cylinders and cylinders of the second number of cylinders are respectively arranged alternately next to one another. This specifically means in particular that a cylinder that is operated in one operating mode, for example four-stroke operation, is in each case surrounded by cylinders that are operated in a different operating mode, for example two-stroke operation. In this way, thermal and mechanical stresses can be advantageously kept uniform for all the cylinders.

Within the scope of a particularly preferred development, it is provided that a first exhaust gas flow of the first number of cylinders is passed directly to a low-pressure stage of the supercharger arrangement, in particular past a high-pressure stage of the supercharger arrangement. This development specifically includes that the exhaust gas flow originating from the cylinders operated in two-stroke operation is supplied for a use, which causes a sufficiently low exhaust back pressure in these cylinders. In this way, a scavenging gradient, sufficient for two-stroke operation, can be advantageously realized in the cylinders concerned. Furthermore, the energy contained in this exhaust gas flow is used in a suitable way, to be specific in the form of the admission to a low-pressure stage of a supercharger arrangement.

In particular, it is provided that a second exhaust gas flow of the second number of cylinders is passed to a high-pressure stage of the supercharger arrangement and subsequently to a low-pressure stage of the supercharger arrangement. This development specifically includes that an exhaust gas flow conducted from the cylinders operated in four-stroke operation is supplied for a use which produces a higher exhaust back pressure in the cylinders concerned. Consequently, the more favorable scavenging conditions of four-stroke operation, which result in a higher possible exhaust back pressure, are advantageously used. This makes use of the fact that in four-stroke operation the process of charging charge air into the cylinder and the process of expelling exhaust gas from the cylinder take place in two separate cycles. In this way, the exhaust gas is expelled from the cylinder at a substantially higher pressure than in two-stroke operation by the exhaust gas being expelled in one stroke together with the charging of the charge air. This higher pressure is correspondingly used advantageously in this development for driving the high-pressure stage of the supercharger arrangement.

It is advantageously provided that a first exhaust gas flow of the first number of cylinders is passed directly, especially past the supercharger arrangement, to an exhaust system, in particular an exhaust, a wastegate or the like. This development specifically includes that the first exhaust gas flow discharged from a first number of cylinders, in particular in two-stroke operation, is not used for driving a turbine, in particular for the purpose of recovering mechanical energy.

This is advantageous if the scavenging gradient or the pressure difference in the cylinders operated in two-stroke operation is insufficient for technically or economically worthwhile energy recovery, in particular for driving a supercharger turbine. By such a development, in this case the exhaust gas back pressure in the cylinders operated in two-stroke operation is kept low to ensure scavenging that is as optimum as possible.

Within the scope of a particularly preferred development, it is provided that the internal combustion engine is operated in successive operating phases by a method as claimed herein, wherein the assignment of a total of cylinders to the first number of cylinders and the second number of cylinders for one operating phase is in each case the reverse of the assignment of a respectively previous operating phase. In this case, an operating phase may be begun with the starting of the engine and ended with the stopping of the engine. Nevertheless, it is possible to end one operating phase during operation of the engine, i.e. with the engine running, and to start a new operating phase directly thereafter, i.e. in particular without restarting the engine. Such a development leads to the advantage that, as a result of the alternate assignment of the operating modes, thermal and mechanical loads are distributed, in particular over time. In this way it is ensured that a cylinder that was previously operated in four-stroke operation is operated in the next operating phase in two-stroke operation. Consequently, uneven wear of certain components of the internal combustion engine, which would occur in the case of a fixed unchangeable assignment of cylinders to be operated in two-stroke or four-stroke operation, is advantageously avoided.

The invention also leads to the object being achieved by providing a device for carrying out a method as claimed herein, in particular for operating an internal combustion engine, and providing an internal combustion engine, with a first number of cylinders, a second number of cylinders and a supercharger arrangement with at least one high-pressure stage and one low-pressure stage, designed to carry out a method described herein.

Embodiments of the invention will now be described below with reference to the drawings. The latter is not necessarily intended to represent the embodiments to scale; rather, the drawings take a schematized and/or slightly distorted form where useful for explanatory purposes. With regard to additions to the teachings which are directly evident from the drawing, reference is made to the relevant prior art. Here, it should be taken into consideration that a wide variety of modifications and changes concerning the form and the detail of an embodiment can be made without departing from the general idea of the invention. The features of the invention which are disclosed in the description, in the drawings and in the claims may be essential both individually and in any desired combination for the development of the invention. In addition, the scope of the invention covers all combinations of at least two of the features disclosed in the description, the drawing and/or the claims. The general idea of the invention is not restricted to the exact form or the detail of the preferred embodiments shown and described below or limited to subject matter which would be restricted by comparison with the subject matter claimed in the claims. Where dimensional ranges are specified, values lying within the stated limits are also intended to be disclosed as limit values and able to be used and claimed as desired. For the sake of simplicity, identical reference signs are used below for identical or similar parts or parts having an identical or similar function.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2A shows a schematic representation of a sequence of a two-stroke combustion process;

FIG. 2B shows a schematic representation of another sequence of the two-stroke combustion process of FIG. 2A;

FIG. 3A shows a schematic representation of one sequence of a four-stroke combustion process, the sequence being sequentially represented in FIGS. 3A-3D;

FIG. 3B shows another schematic representation of one sequence of a four-stroke combustion process, the sequence being sequentially represented in FIGS. 3A-3D;

FIG. 3C shows yet another schematic representation of one sequence of a four-stroke combustion process, the sequence being sequentially represented in FIGS. 3A-3D;

FIG. 3D shows still another schematic representation of one sequence of a four-stroke combustion process, the sequence being sequentially represented in FIGS. 3A-3D.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
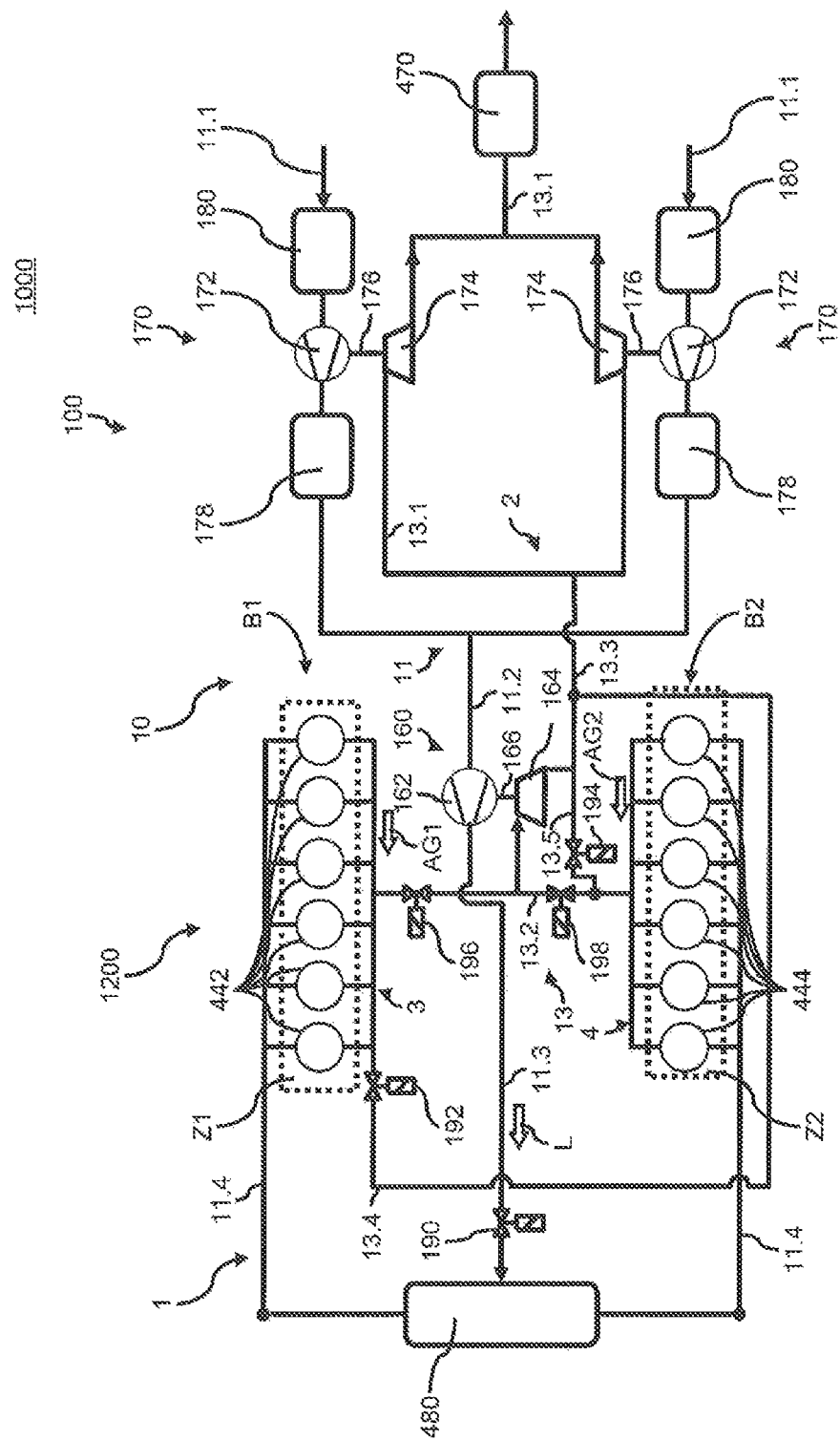
FIG. 1 shows an internal combustion engine of a preferred embodiment of the present invention in a schematic representation.

Referring now to the drawings, and more particularly to FIG. 1 there is shown an internal combustion engine 1000 with a gas flow control system 10 in a first embodiment of the invention. The gas flow control system 10 is arranged at the periphery of an engine 1200 for conducting gas, i.e. fresh air and exhaust gas. Engine 1200 has an inflow-side periphery and an outflow-side periphery. Engine 1200 is shown symbolically in the form of a large diesel engine and has a first cylinder bank B1 with a first gas delivery 3 and a second cylinder bank B2 with a second gas delivery 4.

A gas flow control system 100 has an inflow-side gas supply 1 for supplying gas to an input side of engine 1200. Gas supply 1 has in the present case a fresh air section 11. Fresh air section 11 of gas supply 1 is initially formed by a raw air section 11.1 for taking in raw air with an air filter 180 ahead of a low-pressure compressor 172 with a downstream intercooler 178. In the present case, two raw air sections 11.1 and two low-pressure compressors 172 and two intercoolers 178 are provided.

The two raw air sections 11.1 are brought together into a common charge air gap 11.2 ahead of a high-pressure compressor 162, which is adjoined by a high-pressure charge air section 11.3, which leads from the high-pressure compressor 162 to a charge air cooler 480. On the inflow side of charge air cooler 480 there is a supply-line separating means 190, by which the gas-conducting connection between a charge air section 11.3 and the charge air cooler 480 can be established or interrupted. On an outflow side of charge air cooler 480, there adjoins, in the present case, two cylinder charge air sections 11.4 of fresh air section 11, which establish a gas-conducting connection to cylinders 442, arranged on first cylinder bank B1 or cylinders 444 arranged on second cylinder bank B2.

The compressors of the supercharger arrangement 100, to be specific the two low-pressure compressors 172 and the high-pressure compressor 162, are respectively driven by a turbine 164, 174 of the outflow-side gas discharge 2. For this purpose, two low-pressure turbines 174 in a low-pressure exhaust gas section 13.1 and a high-pressure turbine 164 in an intermediate exhaust gas section 13.3 are arranged between low-pressure turbines 174 and a high-pressure exhaust gas section 13.2 of exhaust gas line 13. An outflow-side gas discharge 2 adjoins on the outflow side of the high-pressure exhaust gas section 13.2 of line 13, which is connected to gas deliveries 3, 4. Gas deliveries 3, 4 are respectively connected on the outflow side of engine 1200 to cylinders 442, 444 of cylinder banks B1, B2, that is to say in the present case are arranged on an output side of engine 1200.

Engine 1200 is operable according to the concept of the invention in four-stroke operation, in two-stroke operation or in a hybrid operation, that is to say with some cylinders in four-stroke operation and some other cylinders in two-stroke operation. For two-stroke operation, in particular a charge is provided in order to achieve sufficient scavenging, in particular head loop scavenging, of the cylinders.

In the present illustration, all of the cylinders 442 of a first number Z1 of cylinders are arranged on the first cylinder bank B1. Furthermore, all of the cylinders 444 of a second number Z2 of cylinders are arranged on the second cylinder bank B2. Also possible of course are assignments different from this, as explained in more detail below for example in connection with FIG. 4.

In the present case, internal combustion engine 1000 in a first main operating mode is explained. Here, cylinders 442 of first cylinder bank B1 are operated in two-stroke operation and the cylinders 444 of second cylinder bank B2 are operated in four-stroke operation. For carrying out hybrid operation, in the present case a first exhaust gas flow AG1 originating from cylinders 442 of first cylinder bank B1 and a second exhaust gas flow AG2 originating from cylinders 444 of second cylinder bank B2 are conducted separately. For this purpose, arranged on high-pressure exhaust section 13.2, which connects first gas delivery 3 and second gas delivery 4, are a first barrier separating means 196, which is closed for this purpose, and a second barrier separating means 198, which is open for this purpose. Furthermore, a first bypass separating means 192, arranged on first gas delivery 3, and a second bypass separating means 194, arranged on second gas delivery 4, provide the possibility of respectively passing exhaust gas flow AG1 or AG2, originating from the corresponding cylinder bank B1 or B2 directly, especially past a high-pressure stage 160 of supercharger arrangement 100, to low-pressure turbine 174 of low-pressure stage 170 of supercharger arrangement 100.

In the present case, first bypass separating means 192 is open. In this way, first exhaust gas flow AG1 of cylinders 442 operated in two-stroke operation is passed via a first bypass line 13.4 directly to low-pressure exhaust gas section 13.3, and consequently advantageously achieves a low exhaust gas back pressure for cylinders 442 operated in two-stroke operation. From low-pressure exhaust gas section 13.3, first exhaust gas stream AG1 is passed directly to low-pressure turbines 174 of low-pressure stage 170. Both low-pressure turbines 174 are respectively connected via a low-pressure turbine shaft 176 for transmitting a rotational movement in each case to low-pressure compressor 172.

Furthermore, second bypass separating means 194 is closed and second barrier separating means 198 is open, whereby second exhaust gas flow AG2 originating from cylinders 444 of second cylinder bank B2 is passed via high-pressure exhaust gas section 13.2 to high-pressure turbine 164 of high-pressure stage 160. This achieves the effect that second exhaust gas flow AG2, which has a higher exhaust gas pressure than first exhaust gas flow AG1 due to the four-stroke operation of cylinders 444, is used for acting on high-pressure turbine 164. High-pressure turbine 164, which is set in rotary motion by exhaust gas flow AG2, drives high-pressure compressor 162 via a high-pressure turbine shaft 166. Here, first barrier separating means 196 is closed and second barrier separating means 198 is open.

Nevertheless, a reverse assignment of first number Z1 of cylinders and second number Z2 of cylinders is just as conceivable in a second main operating mode. By a corresponding closing of first bypass separating means 192 and an opening of second bypass separating means 194, first exhaust gas flow AG1 of cylinders 442, now operated in four-stroke operation, can consequently be passed to high-pressure turbine 164, and correspondingly second exhaust gas flow AG2 of cylinders 444, now operated in two-stroke operation, is passed via a second bypass line 13.5 directly to low-pressure turbine 174 of low-pressure stage 170. For this purpose, correspondingly first barrier separating means 196 is open and second barrier separating means 198 is closed.

By way of separating means 192, 194, 196, 198, the assignment of cylinders 444 operated in four-stroke mode and cylinders 442 operated in two-stroke mode can consequently be reversed in any way desired, according to the concept of the invention, in particular to ensure uniform loading of all the cylinders and engine components connected to the cylinder.

By the separation, and in particular the separate use of first exhaust gas flow AG1 and second exhaust gas flow AG2, an advantageous use, in particular a use corresponding to the different exhaust gas pressures of both exhaust gas flows, or recovery of the exhaust gas energy is consequently achieved.

Alternatively, it is also conceivable not to pass the exhaust gas flows AG1, AG2 to a supercharger arrangement to make possible a scavenging gradient sufficient for two-stroke operation, but to divert them via a wastegate or the like.

The following shows the switching states of the separating means in the two main operating modes described above:

|  | First main operating mode | Second main operating mode |
| --- | --- | --- |
| First bypass separating means 192 | Open | Closed |
| Second bypass separating means 194 | Closed | Open |
| First barrier separating means 196 | Closed | Open |
| Second barrier separating means 198 | Open | Closed |

Now, additionally referring to FIG. 2A and FIG. 2B there is shown a schematic representation of the sequence of a two-stroke combustion process. Shown in FIG. 2A is a cylinder 420, in which there is arranged a piston 424 which is movable translationally in the direction of a cylinder axis of cylinder 420. In the representation of FIG. 2A, piston 424 is in the vicinity of a bottom dead center UT. According to the principle of head loop scavenging, gas, in particular a two-stroke charge air flow L2T, flows into combustion chamber 432 formed substantially by a cylinder wall 422 of cylinder 420 and piston 424. For this purpose, charge air L2T is conveyed through at least one inlet valve 426E into combustion chamber 432.

For this, two-stroke charge air flow L2T is previously compressed by a compressor 162, which is not shown here, to a sufficiently high pressure for two-stroke operation. At the same time, exhaust gas located in combustion chamber 432 is displaced as charge air flow L2T flows in. This exhaust gas leaves combustion chamber 432 in the form of a two-stroke exhaust gas flow A2T through at least one outlet valve 426A, which in the present case is arranged on the upper side of cylinder 420 in the vicinity of a top dead center OT.

The process represented in FIG. 2A thus involves a charging of the combustion chamber 432 with charge air L2T and, virtually at the same time, an expulsion of exhaust gas A2T.

In FIG. 2B, piston 424 is in the vicinity of a top dead center, i.e. combustion chamber 432 has almost reached its minimum volume. This means that charge air L2T, which previously flowed into combustion chamber 432 has been compressed by the upward movement of piston 424, and consequently by the reduction in size of combustion chamber 432. Inlet valve 426E and outlet valve 426A are in this case closed, to prevent charge air L2T from escaping. The state shown represents virtually the end of the compression process.

An ignition ZUE of the compressed gas in combustion chamber 432 then, in the phase which is also referred to as the working phase, causes piston 426 to be moved downward in the direction of a bottom dead center UT by the expanding gas. Virtually when the bottom dead center UT is reached by piston 424, the cycle begins anew by the charging and expulsion process shown in FIG. 2A.

Now, additionally referring to FIGS. 3A to 3D there is shown a schematic representation of the sequence of a four-stroke combustion process. In FIG. 3A, the process of charging in cylinder 420 is shown. As a result of the position of piston 424 close to the bottom dead center UT, combustion chamber 432 has virtually its largest possible volume. A four-cycle charge air flow L4T flows through the open inlet valve 426E into combustion chamber 432, in particular as a result of prior pressurization by a compressor 162, not shown here, and/or as a result of a negative pressure generated by the downward movement of piston 424. By contrast with the two-stroke operation shown in FIG. 2A, in the present case outlet valve 426A is closed.

In FIG. 3B, piston 424 is close to the top dead center OT. Inlet valve 426E and outlet valve 426A are closed; the gas which flowed in in the previous step, shown in FIG. 3A, is thus already compressed at the time shown in the present case. The state shown in FIG. 3B represents virtually the end of the compression cycle. An ignition ZUE then takes place.

In FIG. 3C, piston 424 is again at the bottom dead center UT. This state has been preceded by an expansion caused by ignition ZUE of the compressed gas, which in turn took place following the end state of compression shown in FIG. 3B. The state shown in FIG. 3C thus represents virtually the end of the work or the working phase, in which a drive movement of engine 1200 is produced.

In FIG. 3D, finally, the expulsion of an exhaust gas which has occurred during the preceding expansion or ignition takes place. For this purpose, outlet valve 426A is opened such that, when there is an upward movement of the piston 424 or when there is a reduction in the size of combustion chamber 432, the exhaust gas leaves the combustion chamber 432 in the form of a four-stroke exhaust gas flow A4T.

Figure 4:
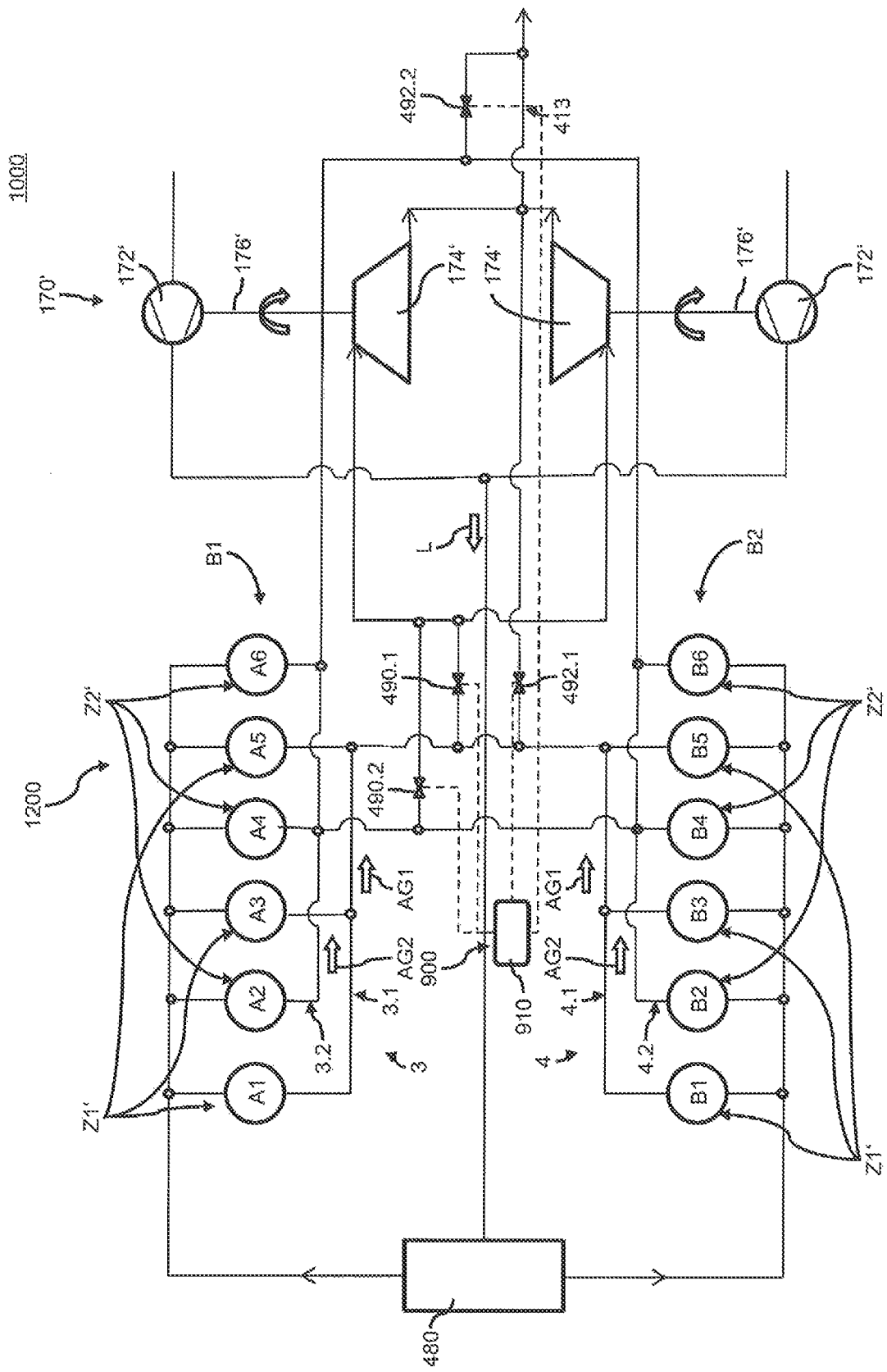
FIG. 4 shows an internal combustion engine of a further preferred embodiment of the present invention in a schematic representation.

Now, additionally referring to FIG. 4 there is shown an internal combustion engine 1000 according to a further preferred embodiment. Engine 1200 is likewise designed as a 12-cylinder engine. In particular as a difference from the embodiment shown in FIG. 1, engine 1200 shown here is charged in a single stage, to be precise via a compressor stage 170'. Here, cylinders A1 to A6 are arranged on a first cylinder bank B1 and cylinders B1 to B6 are arranged on a second cylinder bank B2. In the present case, the cylinders A1, A3, A5, B1, B3, B5 form a first number Z1' of cylinders. Furthermore, the cylinders A2, A4, A6, B2, B4, B6 form a second number Z2' of cylinders.

According to the division into a first number Z1' of cylinders and a second number Z2' of cylinders, both first gas delivery 3 of first cylinder bank B1 and second gas delivery 4 of second cylinder bank B2 are in each case divided.

Here, the cylinders of first number Z 1', which are arranged in first cylinder bank B1, to be specific cylinders A1, A3 and A5, are connected in a gas-conducting manner via a first delivery branch 3.1 of first gas delivery 3 to a first turbine separating means 490.1.

Furthermore, first delivery branch 3.1 of first gas delivery 3 can be connected in a gas-conducting manner via a first bypass separating means 492.1 directly to an exhaust gas section 413.

Furthermore, the cylinders of first number Z 1', which are arranged on second cylinder bank B2, to be specific the cylinders B1, B3 and B5, are connected in a gas-conducting manner via a first delivery branch 4.1 of second gas delivery 4 to first turbine separating means 490.1.

Also first delivery branch 4.1 of second gas delivery 4 can be connected in a gas-conducting manner via first bypass separating means 492.1 directly to exhaust gas section 413.

By closing first bypass separating means 492.1 and opening first turbine separating means 494.1, the exhaust gas flow AG1 originating from cylinders A1, A3, A5, B1, B3 and B5 of first number Z1' can consequently be passed to one of the two turbines 174'. Turbines 174' are thereby set in motion and, via a turbine shaft 176' in each case, can drive a compressor 172' for the purpose of compressing a charge air flow L. Charge air flow L is in turn supplied via a charge air cooler 480 to cylinders A1 to A6 and B1 to B6.

By opening first bypass separating means 492.1 and closing first turbine separating means 494.1, exhaust gas flow AG1 originating from cylinders A1, A3, A5, B1, B3 and B5 of first number Z1' can in turn be passed directly to exhaust gas section 413. This is particularly conducive to two-stroke operation, since a significantly lower exhaust back pressure is generated as a result of bypassing compressor stage 170'.

The cylinders of second number Z2', which are arranged on first cylinder bank B1, to be specific cylinders A2, A4 and A6, are connected in a gas-conducting manner via a second delivery branch 3.2 of first gas delivery 3 to a second turbine separating means 490.2. Furthermore, second delivery branch 3.2 of first gas delivery 3 can be connected in a gas-conducting manner via a second bypass separating means 492.2 directly to exhaust gas section 413.

By analogy with first cylinder bank B1, the cylinders of second number Z2', which are arranged on second cylinder bank B2, to be specific cylinders B2, B4 and B6, are connected in a gas-conducting manner via a second delivery branch 4.2 of second gas delivery 4 to second turbine separating means 490.2. Furthermore, second delivery branch 4.2 of second gas delivery 4 can likewise be connected in a gas-conducting manner via second bypass separating means 492.2 directly to exhaust gas section 413.

By closing second bypass separating means 492.2 and opening second turbine separating means 490.2, exhaust gas flow AG2 originating from cylinders A2, A4, A6, B2, B4 and B6 of the second number Z2' can consequently be passed to one of the two turbines 174'. Turbines 174' are thereby set in motion and, via a turbine shaft 176' in each case, drive a compressor 172' for the purpose of compressing a charge air flow L. The charge air flow L is in turn supplied via a charge air cooler 480 to cylinders A1 to A6 and B1 to B6.

By opening second bypass separating means 492.2 and closing second turbine separating means 494.2, in turn exhaust gas flow AG2 originating from cylinders A2, A4, A6, B2, B4 and B6 is passed directly to exhaust gas section 413. This is particularly conducive to two-stroke operation, since a significantly lower exhaust back pressure is generated as a result of bypassing compressor stage 170'.

Consequently, it is advantageously possible for example to operate the cylinders of first number Z1' in four-stroke operation, and the cylinders of second number Z2' simultaneously in two-stroke operation. For this purpose, first turbine separating means 490.1 and second bypass separating means 492.2 are open, and second turbine separating means 490.2 and first bypass separating means 492.1 are closed.

Conversely, in the present case it is equally possible to operate the cylinders of first number Z1' in two-stroke operation, and the cylinders of second number Z2 in four-stroke operation. For this purpose, first turbine separating means 490.1 and second bypass separating means 492.2 are closed, and second turbine separating means 490.2 and first bypass separating means 492.1 are open.

Also schematically shown is a device 900 for operating internal combustion engine 1000, which in the present case comprises a control and processor means 910. As illustrated in the present case by dashed lines, this control and processor means 910 is connected in a signal-conducting manner to separating means 490.1, 490.2, 492.1 and 492.2. In this way, the concept of the invention can be implemented for example in the sense of an automatic system or control circuit shown in this preferred embodiment. In particular, separating means 490.1, 490.2, 492.1 and 492.2 can be set in a way corresponding to the method according to the concept of the invention, that is to say be opened or closed. Furthermore, control and processor means 910 is in signal-conducting connection with a controller of internal combustion engine 1000 that is not shown here, in particular a higher-level controller. It may additionally or alternatively also be part of this, in order to implement the method according to the concept of the invention, in particular the switching over of the cylinders from two-stroke operation to four-stroke operation or from four-stroke operation to two-stroke operation.

In the present embodiment, the shown assignment of cylinders to a first number Z1' and a second number Z2' is virtually alternately next to one another and distributed among both cylinder banks B1, B2. Nevertheless, it is of course conceivable to choose another grouping, such as for example the embodiment shown in FIG. 1 or another.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE SIGNS

1 Gas supply
2 Gas discharge
3 First gas delivery, gas delivery of the first cylinder bank
3.1 First delivery branch of the gas delivery of the first cylinder bank
3.2 Second delivery branch of the gas delivery of the first cylinder bank
4 Second gas delivery, gas delivery of the second cylinder bank
4.1 First delivery branch of the gas delivery of the second cylinder bank
4.2 Second delivery branch of the gas delivery of the second cylinder bank
10 Gas flow control system
11 Fresh air section
11.1 Raw air section
11.2 Common charge air section
11.3 High-pressure charge air section
11.4 Cylinder charge air section
13 Exhaust line
13.1 Low-pressure exhaust gas section
13.2 High-pressure exhaust gas section
13.3 Intermediate exhaust gas section
13.4 First bypass section
13.5 Second bypass section
100 Supercharger arrangement
160 High-pressure stage of the supercharger arrangement
162 High-pressure compressor
164 High-pressure turbine
166 High-pressure turbine shaft
170 Low-pressure stage of the supercharger arrangement
170' Compressor stage
172 Low-pressure compressor
172' Compressor
174 Low-pressure turbine
174' Turbine
176 Low-pressure turbine shaft
176' Turbine shaft
178 Intercooler
180 Air filter
190 Supply line separating means
192 First bypass separating means
194 Second bypass separating means
196 1st barrier separating means
198 2nd barrier separating means
413 Exhaust gas section
420 Cylinder
422 Cylinder wall
424 Piston
426 Valve
426A Outlet valve
426E Inlet valve 432 Combustion chamber
442 Cylinders of the first number of cylinders
444 Cylinders of the second number of cylinders
470 Exhaust system, exhaust
480 Charge air cooler
490.1 First turbine separating means
490.2 Second turbine separating means
492.1 First bypass separating means
492.2 Second bypass separating means
900 Device for operating an internal combustion engine
910 Control and processor means
1000 Internal combustion engine
1200 Engine
AG Exhaust gas flow
AG1 First exhaust gas flow, exhaust gas flow of the first number of cylinders
AG2 Second exhaust gas flow, exhaust gas flow of the second number of cylinders
A2T Cylinder exhaust gas flow in 2-stroke operation
A4T Cylinder exhaust gas flow in 4-stroke operation
B1 First cylinder bank
B2 Second cylinder bank
L Charge air flow
L2T Cylinder charge air flow in 2-stroke operation
L4T Cylinder charge air flow in 4-stroke operation
OT Top dead center
UT Bottom dead center
Z1, Z1' First number of cylinders, first cylinder
Z2, Z2' Second number of cylinders, second cylinder
ZUE Ignition

What is claimed is:

1. A method for operating an internal combustion engine, the internal combustion engine including an engine with a first number of cylinders and a second number of cylinders and a supercharger arrangement, the method comprising the steps of:
supplying a charge air flow to the engine, the charge air being compressed by at least one compressor and at least one turbine that is acted on by an exhaust gas flow discharged from the engine; and
operating the engine in a main operating mode that includes:
operating the first number of cylinders in a two-stroke operation; and
operating the second number of cylinders in a four-stroke operation,
wherein a scavenging gradient is greater for the first number of cylinders operated in the two-stroke operation than for the second number of cylinders operated in the four-stroke operation,
wherein a second exhaust gas flow of the second number of cylinders operated in the four-stroke operation is used for producing the scavenging gradient in the first number of cylinders operated in the two-stroke operation.

2. The method as claimed in claim 1, further comprising the steps of:
operating the engine in a four-stroke operating mode by operating the first number of cylinders and the second number of cylinders in the four-stroke operation; and/or
operating the engine in a two-stroke operating mode by operating the first number of cylinders and the second number of cylinders in the two-stroke operation.

3. The method as claimed in claim 2, further comprising the step of switching the engine over from the four-stroke operation of the four-stroke operating mode to the two-stroke operation of the two-stroke operating mode.

4. The method as claimed in claim 2, further comprising the step of switching the engine over from the two-stroke operation of the two-stroke operating mode to the four-stroke operation of the four-stroke operating mode.

5. The method as claimed in claim 1, wherein in the main operating mode, the first number of cylinders or at least one first cylinder or the second number of cylinders or at least one second cylinder is switched over from the four-stroke operation to the two-stroke operation.

6. The method as claimed in claim 1, wherein in the main operating mode, the first number of cylinders or at least one first cylinder or the second number of cylinders or the at least one second cylinder is switched over from the two-stroke operation to the four-stroke operation.

7. The method as claimed in claim 1, wherein when operating the internal combustion engine of a number of cylinders of the first and second number of cylinders in the two-stroke operation, one or more of the number of cylinders are scavenged by head loop scavenging.

8. The method as claimed in claim 1, wherein the first number of cylinders are arranged in a first cylinder bank and the second number of cylinders are arranged in a second cylinder bank.

9. The method as claimed in claim 1, wherein cylinders of the first number of cylinders and cylinders of the second number of cylinders are respectively arranged alternately next to one another.

10. The method as claimed in claim 1, further comprising the step of passing a first exhaust gas flow of the first number of cylinders directly past a high-pressure stage of the supercharger arrangement to a low-pressure stage of the supercharger arrangement.

11. The method as claimed in claim 10, further comprising the step of passing the second exhaust gas flow of the second number of cylinders to the high-pressure stage of the supercharger arrangement and subsequently to a low-pressure stage of the supercharger arrangement.

12. The method as claimed in claim 1, further comprising the step of passing a first exhaust gas flow of the first number of cylinders directly past the supercharger arrangement to an exhaust system, or a wastegate or the like.

13. The method as claimed in claim 1, further comprising the step of successively operating the internal combustion engine in a first operating phase and a second operation phase, wherein an assignment of a total number of cylinders to each of the first number of cylinders and the second number of cylinders for the first operating phase is the reverse of the assignment of the second operating phase.

14. A device for operating an internal combustion engine, comprising:
an engine with a first number of cylinders and a second number of cylinders;
a supercharger arrangement wherein a charge air flow is supplied to the engine, the charge air flow being compressed by at least one compressor and at least one turbine that is acted on by an exhaust gas flow discharged from the engine;
control and processor means carrying out a method for controlling and regulating the internal combustion engine by executing the step of operating the internal combustion engine in a main operating mode,
wherein the first number of cylinders of the engine are operated in a two-stroke operation and the second number of cylinders of the engine are operated in a four-stroke operation,
wherein a scavenging gradient is greater for the first number of cylinders operated in the two-stroke operation than for the second number of cylinders operated in the four-stroke operation, wherein a second exhaust gas flow of the second number of cylinders operated in the four-stroke operation is used for producing the scavenging gradient in the first number of cylinders operated in the two-stroke operation.

15. An internal combustion engine, comprising:

an engine with a first number of cylinders and a second number of cylinders;

a supercharger arrangement with at least one low-pressure stage wherein a charge air flow supplied to the engine is compressed by at least one compressor and at least one turbine acted on by an exhaust gas flow discharged from the engine; and a control or processor carrying out the step of operating the internal combustion engine in a main operating mode, wherein the first number of cylinders are operated in a two-stroke operation and the second number of cylinders are operated in a four-stroke operation, wherein a scavenging gradient is greater for the first number of cylinders operated in the two-stroke operation than for the second number of cylinders operated in the four-stroke operation, wherein a second exhaust gas flow of the second number of cylinders operated in the four-stroke operation is used for producing the scavenging gradient in the first number of cylinders operated in the two-stroke operation.

\* \* \* \* \*